United States Patent [19]

Nerstad et al.

[11] Patent Number: 4,658,673
[45] Date of Patent: Apr. 21, 1987

[54] PLANETARY TRANSMISSION

[75] Inventors: Karl A. Nerstad, Peoria; Willis E. Windish, Pekin, both of Ill.

[73] Assignee: Caterpillar Inc., Peoria, Ill.

[21] Appl. No.: 869,487

[22] Filed: Jun. 2, 1986

Related U.S. Application Data

[62] Division of Ser. No. 660,353, Oct. 12, 1984, Pat. No. 4,614,133.

[51] Int. Cl.[4] .......................... F16H 3/44; F16H 57/10; F16H 37/00
[52] U.S. Cl. .......................................... 74/769; 74/740; 74/764
[58] Field of Search ................. 74/768, 769, 740, 764, 74/758

[56] References Cited

U.S. PATENT DOCUMENTS

| 3,033,333 | 5/1962 | Breting et al. ................... 74/769 X |
| 3,347,113 | 10/1967 | Ramsel ........................... 74/688 |
| 3,815,445 | 6/1974 | Gorrell et al. ..................... 74/740 |
| 3,941,013 | 3/1976 | Miller ............................ 74/740 |
| 3,954,028 | 5/1976 | Windish ......................... 74/792 |
| 4,090,415 | 5/1978 | Gorrell et al. ................... 74/769 |
| 4,178,813 | 12/1979 | Smemo .......................... 74/740 X |
| 4,420,992 | 12/1983 | Windish ......................... 74/758 X |
| 4,531,428 | 7/1985 | Windish ......................... 74/768 X |

FOREIGN PATENT DOCUMENTS 666691 7/1963 Canada ................................. 74/768

Primary Examiner—Rodney H. Bonck
Assistant Examiner—Dirk Wright
Attorney, Agent, or Firm—Charles E. Lanchantin, Jr.

[57] ABSTRACT

A compact planetary transmission includes a plurality of interconnected planetary gear sets arranged along a common axis, and a plurality of brake assemblies and a clutch assembly used therewith to provide up to five speeds. It is preferably coupled to a leading reversible countershaft transmission to provide the desired speeds for an agricultural tractor, earthmoving vehicle or the like.

3 Claims, 7 Drawing Figures

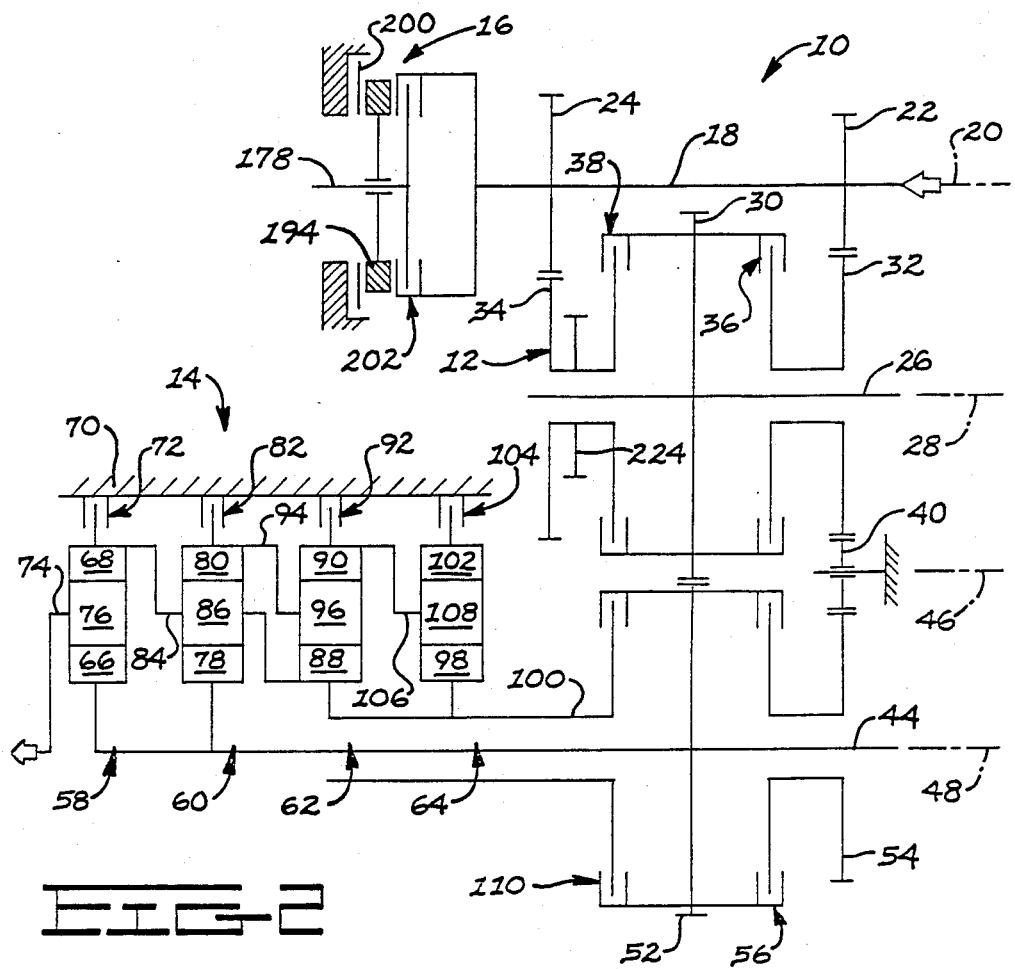
| GEAR | 1 | 2 | 3 | 4 | 5 | 6 | 7 | 8 | 9 | 10 | 1R | 2R |
|---|---|---|---|---|---|---|---|---|---|---|---|---|
| CLUTCHES AND BRAKES ENGAGED | 36/72 | 38/72 | 36/82 | 36/92 | 36/104 | 38/82 | 38/92 | 38/104 | 36/110 | 38/110 | 56/72 | 56/104 |
| COUNTERSHAFT REDUCTION | -1.14 | -0.76 | -1.14 | -1.14 | -1.14 | -0.76 | -0.76 | -0.76 | -1.14 | -0.76 | 1.56 | 1.56 |
| PLANETARY REDUCTION | 4.57 | 4.57 | 2.57 | 2.24 | 1.96 | 2.57 | 2.24 | 1.96 | 1 | 1 | 4.57 | 1.96 |
| TOTAL REDUCTION | -5.23 | -3.46 | -2.93 | -2.56 | -2.23 | -1.94 | -1.70 | -1.48 | -1.14 | -0.76 | 7.13 | 3.04 |
| STEP RATIO |  | 1.51 | 1.18 | 1.15 | 1.15 | 1.15 | 1.15 | 1.15 | 1.29 | 1.51 |  | 2.34 |

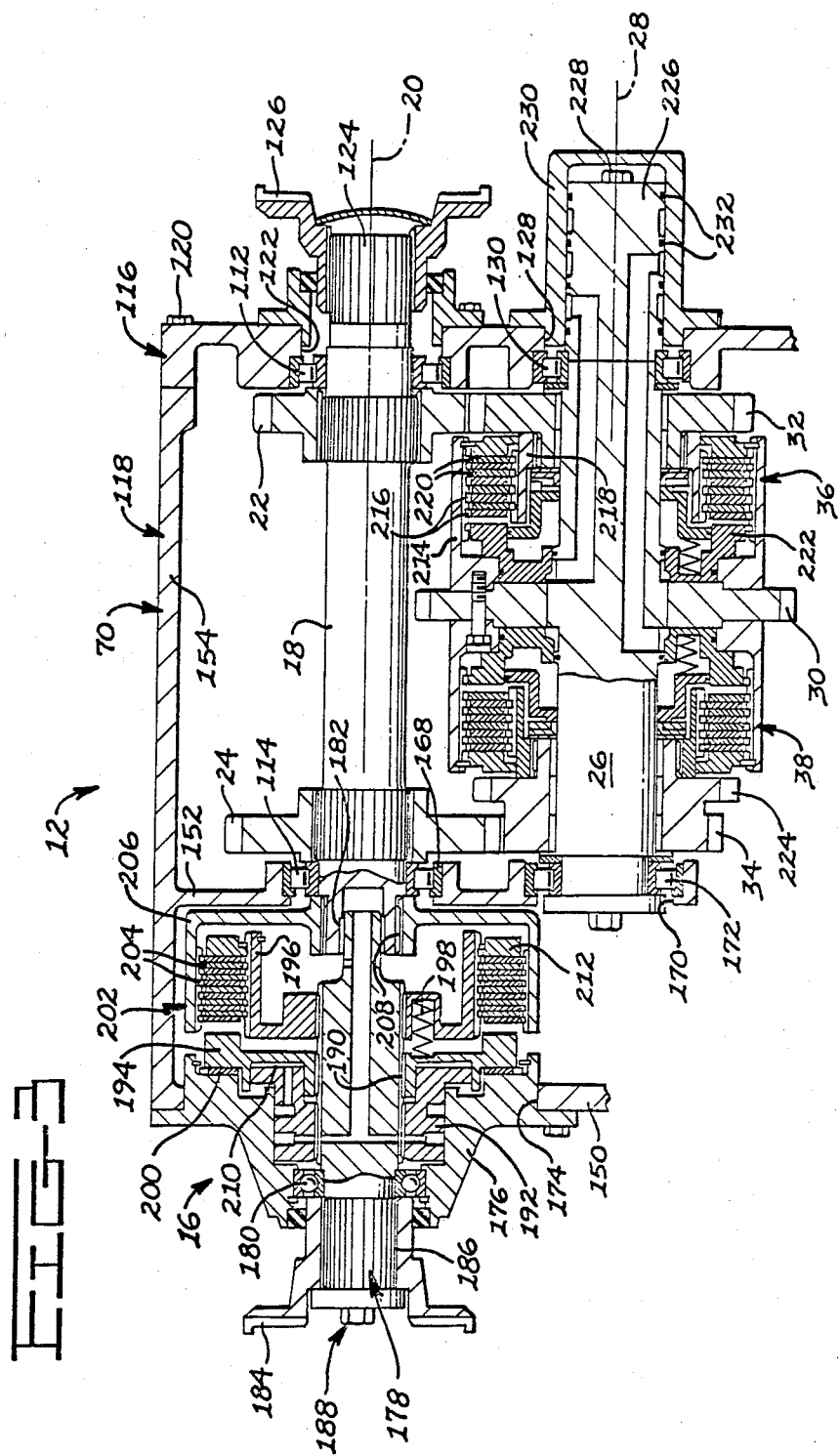

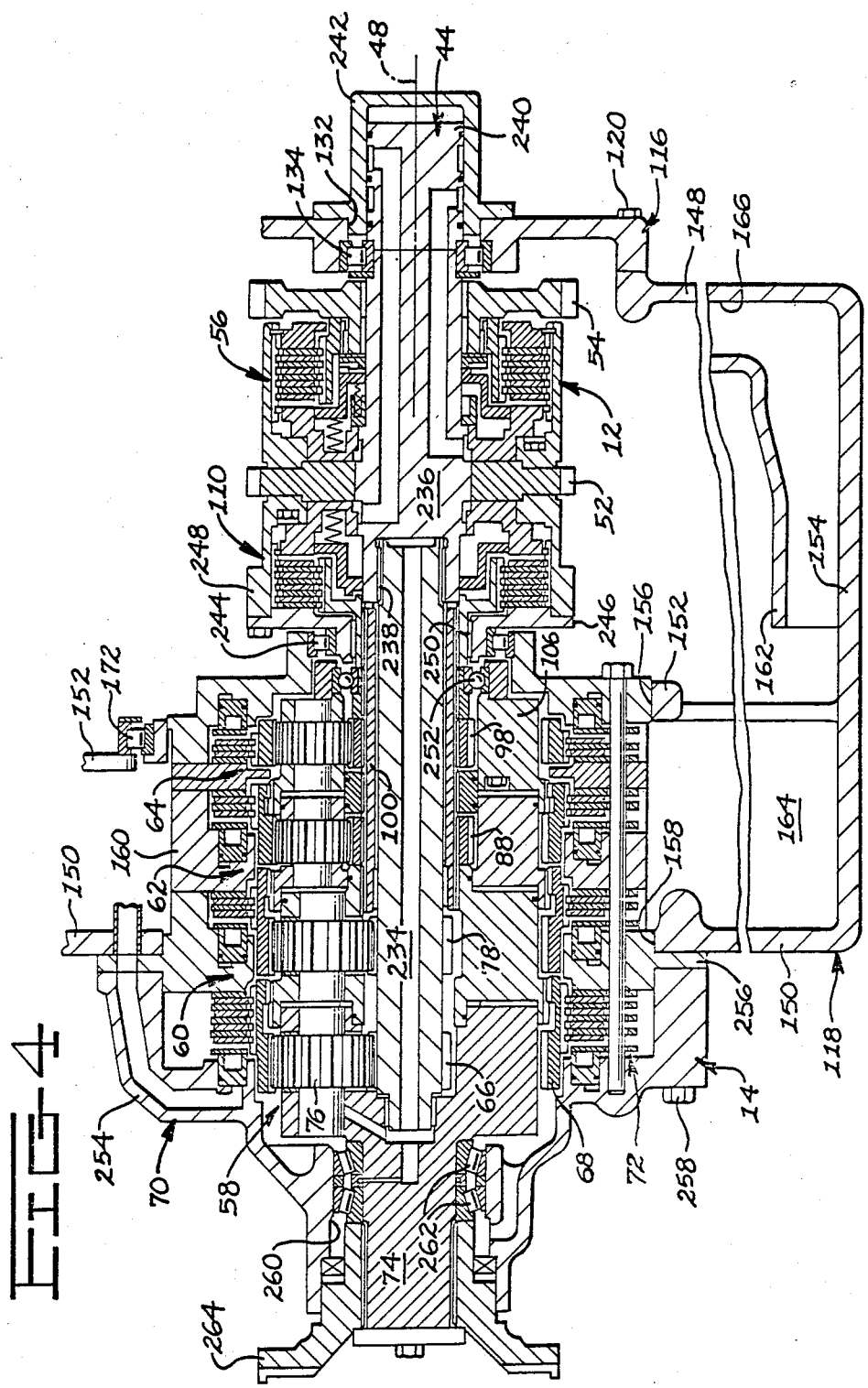

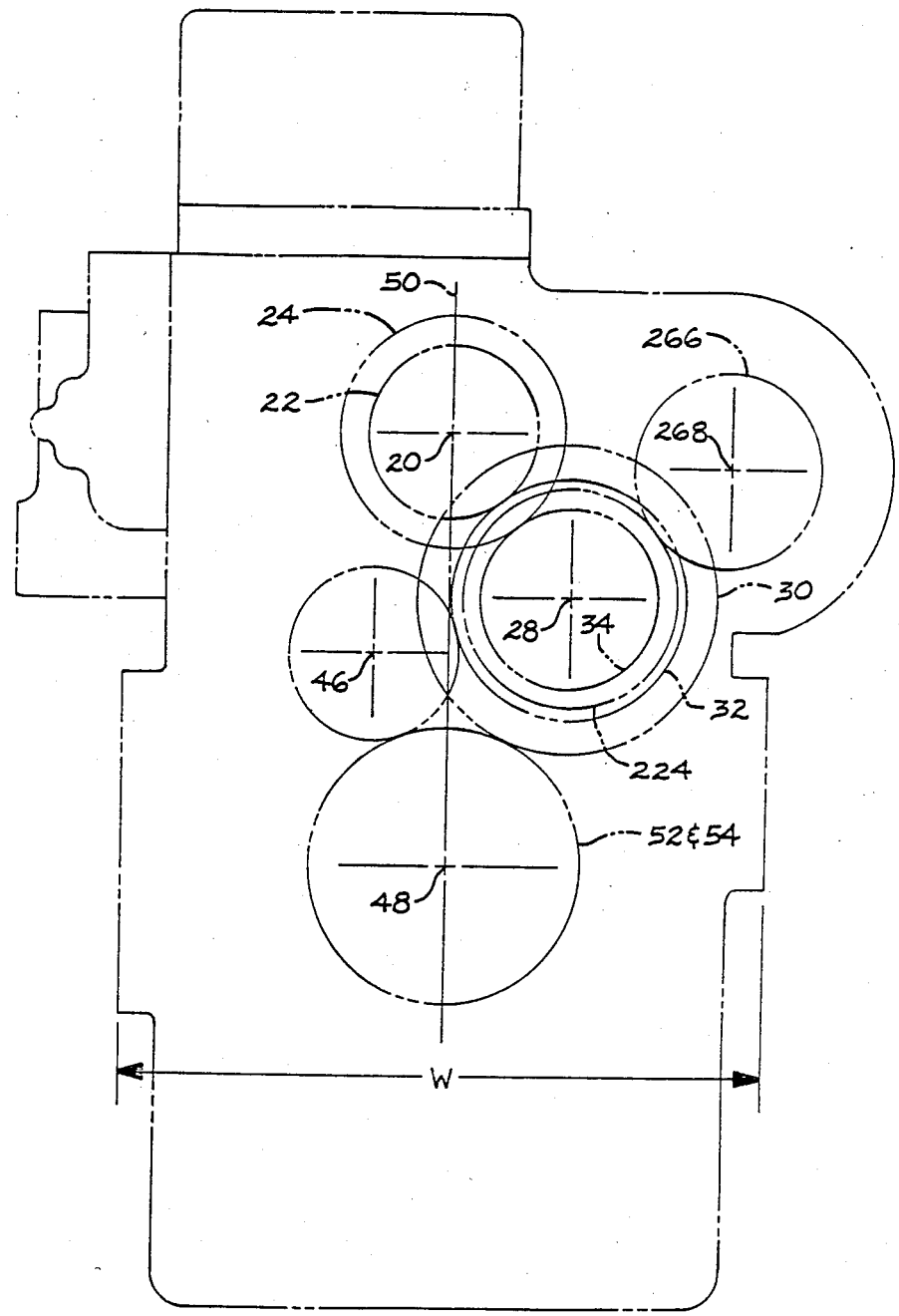

PLANETARY TRANSMISSION

DESCRIPTION

This is a division of Ser. No. 660,353, filed Oct. 12, 1984, now U.S. Pat. No. 4,614,133.

1. Technical Field

This invention relates to a compact multispeed transmission for a vehicle such as an agricultural tractor or the like, and more particularly to a transmission having a plurality of planetary gear sets arranged in series.

2. Background Art

Countershaft transmissions are widely used in the drives lines of vehicle such as wheel loaders, earthmoving tractors, and other off-highway vehicles because the plurality of rotating clutch assemblies and associated gears can be so positioned on the usual parallel shafts as to allow considerable flexibility in adapting them to different space requirements and to different drop heights between the input and output axes. Moreover, a substantial number of simple parts and/or similarly sized parts can be used for manufacturing economy. Exemplifying the art in this area are the following U.S. Pat. Nos.: 3,080,767 issued Mar. 12, 1963 to S. J. Price, Jr.; 3,425,293 issued Feb. 4, 1969 to H. S. Krawczyk, et al; 3,465,609 issued Sept. 9, 1969 to J. F. Fisher, et al; 3,858,455 issued Jan. 7, 1975 to R. L. Sisson, et al; 3,913,616 issued Oct. 21, 1975 to J. Horsch; and 4,341,127 issued July 27, 1982 to E. Stodt.

Another factor of significance is that some of these transmissions have an excessive axial length so they cannot fit into the limited space available in a vehicle. In this regard planetary transmissions employing a considerable number of interconnected planetray gear sets are also known which can provide a plurality of forward and reverse speeds as can be noted by reference to the following U.S. Pat. Nos.: 3,347,113 issued Oct. 17, 1967 to C. A. Ramsel and 3,954,028 issued May 4, 1976 to W. E. Windish. But these transmissions are arranged along a single axis and are of an undesirable length. Also the known planetary systems are not compatible with the increased number of speeds and step ratios required for a tillage-type agricultural vehicle, and require an extra transfer gear train to drop the drive from the upper input axis to the lower output axis aligned with the ground engaging drive members of the vehicle.

One drive train for a motor grader which has received wide commercial acceptance is disclosed in U.S. Pat. No. 3,815,445 issued June 11, 1974 to J. M. Gorrell, et al and in U.S. Pat. No. 3,894,603 issued July 15, 1975 to J. E. Winzeler, both of which are assigned to the assignee of the present invention. In general, that motor grader power train has a leading range section of the countershaft drop box type employing one forward clutch assembly and one reverse clutch assembly and a trailing speed section of the multiple planetary gear set type that can provide a plurality of speeds for each range of the leading section. In actual use eight forward speeds and eight reverse speeds are available to the vehicle operator. However, the speed steps thereof are not faborably grouped for use in an agricultural tillage-type vehicle operation, and the tranmission is relatively complex while being limited to but eight forward speeds.

Other multispeed transmissions have been considered which employ serially arranged range and speed sections as can be appreciated by reference to the following U.S. Pat. Nos.: 3,149,498 issued Sept. 22, 1964 to M. J. Mack; 3,377,885 issued Apr. 16, 1968 to R. M. Tuck, et al; and 4,063,464 issued Dec. 20, 1977 to E. R. Crabb. Still another transmission is disclosed in SAE Paper No. 750818, entitled "The TDMC-33-7002: A 1500 HP Transmission for Shuttle Type Vehicles" presented by J. B. Snoy, et al on or about Sept. 8-11, 1975. These transmissions are also not conveniently adaptable to all of the needs mentioned above.

Accordingly, what is needed is a simple, rugged and compact planetary transmission incorporating a plurality of interconnected planetary gear sets arranged along a common axis which can provide a plurality of operating speeds, and which is preferably compatible with a leading transmission of the countershaft type having a plurality of operating ranges and at least one reverse mode of operation.

DISCLOSURE OF THE INVENTION

The present invention is directed to overcoming one or more of the above problems.

In accordance with one aspect of the invention a planetary transmission includes an input shaft, a first planetary gear set having a first sun gear driven by the input shaft, an output first planet carrier, a first ring gear and a first brake assembly for holding the first ring gear stationary. A second planetary gear set has a second sun gear driven by the input shaft, a second planet carrier connected to the first ring gear, a second ring gear, and a second brake assembly for holding the second ring gear stationary. And a third planetary gear set has a third sun gear connected to the second planet carrier, a third planet carrier connected to the second ring gear, a third ring gear, and a third brake assembly for holding the third ring gear stationary. Advantageously, clutch means is provided for connecting the third sun gear to the input shaft in order to obtain a direct drive mode of operation.

In accordance with a further aspect of the invention, a planetary transmission includes an input shaft, a first planetary gear set having a first sun gear driven by the input shaft, an output first planet carrier, a first ring gear and a first brake assembly for holding the first ring gear stationary. A second planetary gear set has a second sun gear driven by the input shaft, a second planet carrier connected to the first ring gear, a second ring gear, and a second brake assembly for holding the second ring gear stationary. A third planetary gear set has a third sun gear connected to the second planet carrier, a third planet carrier connected to the second ring gear, as third ring gear, and a third brake assembly for holding the third ring gear stationary. And a fourth planetary gear set is featured as having a fourth sun gear connected for joint rotation with the third sun gear, a fourth plane carrier connected for joint rotation with the third ring gear, a fourth ring gear, and a fourth brake assembly for holding the fourth ring gear stationary.

More specifically, the planetary transmission of the present invention employs a plurality of planetary gear sets compactly arranged along a common axis, and is particularly useful in conjunction with a leading countershaft transmission providing two forward speeds and a reverse speed. By providing four speed reduction ratios and a direct drive or 1:1 operating condition in the planetary transmission, which can then be used with the various ranges of the countershaft transmission, at least six forward and two reverse speeds are provided for a vehicle by the combination.

BRIEF DESCRIPTION OF THE DRAWINGS

FIG. 1 is a diagrammatic, developed, but substantially side elevational view of a ten speed forward and two speed reverse vehicle transmission employing a planetary transmission constructed in accordance with the present invention;

FIG. 2 is a chart showing the various gears, the clutches and/or brakes engaged in each gear, the corresponding speed ratio reduction achieved in the leading countershaft transmission and trailing planetary transmission, the total speed ratio reduction for each gear, and the step ratio between adjacent gears;

FIG. 3 is a fragmentary, diagrammatic, sectionalized view through the first and second shafts of the vehicle transmission of FIG. 1 to better illustrate details of construction thereof;

FIG. 4 is a fragmentary, diagrammatic, sectionalized view through the third shaft of the vehicle transmission of FIG. 1 that can be visually connected to the view of FIG. 3;

FIG. 5 is a diagrammatic, front end elevational view of the transmission of FIGS. 1, 3 and 4 showing the position of the various axes thereof and the general nested disposition of certain gears thereof;

BEST MODE FOR CARRYING OUT THE INVENTION

Figure 6:
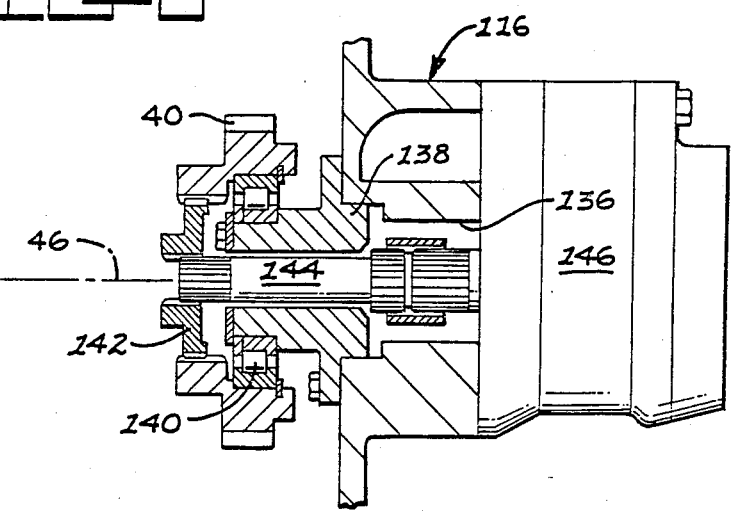
FIG. 6 is a fragmentary, diagrammatic, secionalized view through the idler gear of the transmission of FIG. 1 and showing a pump drive associated therewith.

Referring to FIG. 1 there is diagrammatically shown a vehicle transmission 10 including leading countershaft transmission or range section 12, a trailing planetary transmission or speed section 14, and a power take-off (PTO) section 16.

The countershaft transmission 12 includes an input shaft or first shaft 18 arranged along an upper axis 20 which is preferably in coaxial alignment with the output axis of the vehicle's engine, not shown. A first gear 22 and a second gear 24 are connected for joint rotation with the input shaft. A countershaft or second shaft 26 arranged along a second axis 28 is adapted to be driven by one of these gears and includes a third gear 30 secured thereto and fourth and fifth gears 32 and 34 freely rotatably mounted thereon. The front fourth gear 32 is continually intermeshed with the first gear 22, the rear fifth gear 34 is continually intermeshed with the second gear 24, and a first or low speed rotating clutch assembly 36 and a second or high speed rotating clutch assembly 38 of the interleaved multiple plate and disc type are provided to selectively couple either the fourth gear or the fifth gear directly to the countershaft 26 for joint rotation. Also included is a freely rotatable idler gear or sixth gear 40, and a second countershaft or third shaft 44 that serves as the primary output path of the countershaft transmission. The idler gear 40 and third shaft 44 have third and fourth axes 46 and 48 respectively, and the physical disposition of the four parallel axes 20, 28, 46 and 48 is shown in the diagrammatic end view of FIG. 5. It can be noted from that view that the lower fourth axis 48 is disposed in a vertical plane 50 passing through the upper first axis 20, and that the second and third axes 28 and 46 are located at opposite sides of the plane and elevationally between the upper and lower axes. A seventh gear 52 is connected for joint rotation with the third shaft 44, an eighth gear 54 is freely rotatably connected to the third shaft, and a third or reverse speed rotating cluch assembly 56 is provided for directly connecting the front eighth gear to the third shaft.

Referring next to the trailing planetary transmission 14 which could theoretically provide as many as five speeds for each of the low, high and reverse modes of operation of the leading countershaft transmission 12, it can be notd to include four simple and interconnected planetary gear sets or epicyclic gear trains 58, 60, 62 and 64 basically symmetrically arranged along the lower axis 48. The rear and first planetary gear set 58 is advantageously located at the output of the transmission 10 and provides the greatest speed ratio reduction of the planetary transmission. It includes a first sun gear 66 connected for joint rotation with the third shaft 44, a first ring gear 68 selectively connectable to a housing 70 by a first brake assembly 72, a first planet carrier 74 serving as the output member, and a plurality of first planet gears 76 intermeshingly engaged with the sun gear and the ring gear and mounted on the planet carrier.

The next to last or second planetary gear set 60 provides less speed reduction than the last planetary gear set 58 and includes a second sun gear 78 also connected for joint rotation with the third shaft 44, a second ring gear 80 selectively held to the housing 70 by a second brake assembly 82, a second planet carrier 84 connected for joint rotation with the first ring gear 68, and a plurality of second planet gears 86.

The third planetary gear set 62 provides less speed reduction than either of the first and second planetary gear sets 58 and 60, and similarly includes a third sun gear 88 connected for joint rotation with the second planet carrier 84. It also includes a third ring gear 90, a third brake assembly 92 for holding the third ring gear stationary as a reaction when desired, a third planet carrier 94 connected for joint rotation with the second ring gear 80, and a plurality of third planet gears 96.

The front and fourth planetary gear set 64 provides still less speed reduction and includes a fourth sun gear 98 connected for joint rotation with the third sun gear 88 through an intermediate tubular shaft 100. A fourth ring gear 102 thereof can be selectively held with respect to the housing 70 by a fourth brake assembly 104. And, a fourth planet carrier 106 thereof is connected for joint rotation with the third ring gear 90 and is adapted to carry a plurality of fourth planet gears 108.

A direct drive or lock-up clutch assembly 110 is also provided at the front of the planetary transmission 14 to selectively connect the tubular shaft 100, and thus the third and fourth sun gears 88 and 98, with the third shaft 44 for conjoint rotation. This direct drive clutch assembly is desirably arranged in compact back-to-back relation with the reverse speed clutch assembly 56 of the countershaft transmission 12.

More specifically, and as shown in the more structurally complete views of FIGS. 3 and 4, the input shaft 18 of the countershaft transmission 12 with the first and second gears 22 and 24 splined thereto is rotatably supported in the housing 70 by a front roller bearing assembly 112 and a rear roller bearing assembly 114. In the embodiment illustrated the housing includes a front cover 116 which is releasably secured to a main case 118 by a plurality of peripherally spaced fasteners 120. A stepped cylindrical bore 122 is defined in the front cover for receiving the front roller bearing assembly, and a splined front end 124 of the input shaft extends therethrough and is provided with a connecting flange 126. This connecting flange, for example, can be driven by an output member of a conventional engine driven hydrodynamic torque converter, not shown. A stepped bore 128 is also defined in the cover on the lower second axis 28 for receiving another roller bearing assembly 130, and another stepped bore 132 is defined in the cover on the lowest fourth axis 48 for receiving another roller bearing assembly 134.

Referring to FIG. 6 and the mounting of the idler gear 40, it can be appreciated that the front cover 116 defines another stepped bore 136 for releasably receiving a hollow stubshaft or hub 138. A thrust absorbing roller bearing assembly 140 is mounted on the stationary stubshaft for rotatably supporting the idler gear. An annular connecting plate 142 is splinably coupled to the idler gear and to a transmission pump drive shaft 144, so that with rotation of the idler gear a transmission pump or other auxiliary device 146 can be driven conjointly by the drive shaft.

As best illustrated in FIG. 4, the main case 118 has a front wall 148, a rear wall 150, an apertured intermediate wall 152, and a peripheral connecting wall 154. An inner supporting bore 156 is defined in the intermediate wall and an outer supporting bore 158 is defined in the rear wall which are generally adapted to pilotably receive the outer periphery of a multi-segmented and generally cylindrically shaped housing 160 of the planetary transmission 14. A baffle wall 162 is also integrally defined by the main case to better control flow between an inner chamber or sump region 164 defined within the main case and a pump suction passage 166 also integrally defined by the main case.

In FIG. 3 it can be seen that the intermediate wall 152 of the main case 118 also defines a stepped bore 168 for receiving the rear roller bearing assembly 114 along the upper axis 20 and a stepped bore 170 for receiving another rear roller bearing assembly 172 along the second axis 18. Moreover, the rear wall 150 also defines a bore 174 for generally receiving an annular holder 176 forming a portion of the removable PTO section 16.

The PTO section 16 is optional and includes a PTO shaft 178 rotatably supported in the annular holder 176 by a ball bearing assembly 180 and rotatably supported in a cylindrical bearing or bushing 182 in the rear end of the input shaft 18. A connecting flange 184 is releasably coupled to the outer rear end of the PTO shaft by a spline joint 186 and a retaining device 188. The PTO shaft has an external spline 190 adapted to serially engage an oil distribution manifold 192, an actuating piston 194, and an inner hub 196. A plurality of compression spring 198 react against the hub and urge the actuating piston to the left when viewing FIG. 3 so that a relatively light brake engagement pressure is obtained against an annular braking member 200 nonrotatably coupled to the holder 176. The PTO section also includes a rotating clutch 202 of the usual type having a plurality of interleaved annular plates and annular discs 204 alternately connected to the inner hub 196 and to an outer drum 206 connected to the input shaft 18 via a spline joint 208. In use, fluid is controllaby directed under pressure through the manifold 192 to an actuating chamber 210 defined between the manifold and the actuating piston 194 so that the actuating piston is urged to the right when viewing FIG. 3 against the action of the springs 198. This compresses the annular plates and discs 204 together and against an end reaction plate 212. This is effective to connect the PTO shaft 178 to the input shaft 18 for joint rotation. The subsequent release of pressure to the actuating chamber allows the clutch 202 to be disengaged by the springs and thus the PTO shaft to be decoupled from the input shaft. Simultaneously, as a result of the returning action of the springs 198 against the piston 194 a light braking force is automatically applied against braking member 200 which tends to keep the PTO shaft from rotating.

FIG. 3 also illustrates the hydraulically actuated, multiple plate and disc type of construction of the low speed and high speed rotating clutch assemblies 36 and 38. For example, the low speed clutch assembly 36 includes an outer drum 214 having a first plurality of annular plates 216 splineably connected thereto and an inner hub 218 having a second plurality of annular plates or friction discs 220 splineably connected thereto. The drum is rigidly secured to the second shaft 26 in any conventional manner as through the third gear 30, the hub is suitably coupled to the fourth gear 32 for joint rotation, and when fluid pressure is directed to an actuating piston 222 urging it to the right when viewing FIG. 3 the interleaved plates and discs 216 and 220 are clamped together in the usual way to couple with fourth gear 32 to the second shaft 26. The high speed clutch 38 is constructed and operated in a similar manner however, in the instant embodiment the fifth gear 34 thereof is integrally formed with a pump drive gear 224. Thus, pump drive gear 224 rotates continually at a speed which is a direct function of the speed of input shaft 18.

A seal carrier 226 is releasably secured to the end of the second shaft 26, as by conventional fasteners 228, and an end cap 230 with built-in manifolding is releasably secured to the front cover 116 at the stepped bore 128. Such construction offers the advantages of providing shorter oil supply passages which do not require plugging during manufacturing, more convenient servicing and/or replacement of the seal carrier 226, the end cap 230, and the associated plurality of annular seals 232 without removing or replacing the more expensive second shaft 26.

Referring to FIG. 4, it can be appreciated that the direct drive clutch assembly 110 and the reverse speed clutch assembly 56 are similar in construction to the clutch assemblies 38 and 36 discussed immediately above. The clutch assemblies 110 and 56 are also disposed in back-to-back relation and laterally in longitudinal alignment with the back-to-back clutch assemblies 38 and 36 respectively for compact nesting. In this embodiment the third shaft 44 includes a rear section 234, a central section 236 connected to the rear section by a spline joint 238, and a front seal carrier 240 which is comparable to the seal carrier 226 described earlier. Another end cap 242 is releasably connected to the cover 116 for containing the rotatable seal carrier and for directing both piston actuating oil and cooling oil inwardly through the shaft section 236.

The generally cylindrically shaped planetary housing 160 is pilotably supported in the longitudinally spaced bores 158 and 156, and extends forwardly within the main case 118 to support a roller bearing assembly 244 at the front end thereof. This roller bearing assembly supports a flange 246 and an outer drum 248 of the direct drive clutch assembly 110, and thus serves to rotatably support the seventh gear 52 and the central section 236 of the third shaft 44 as well. A needle bearing or sleeve bearing 250 is generally disposed between the flange 246 and the tubular shaft 100 for supporting the tubular shaft, and a ball bearing assembly 252 is mounted on the tubular shaft for rotatably supporting the fourth planet carrier 106. A rear cover 253 is connected through a mounting flange 256 of the planetary housing 160 to the rear wall 150 by a plurality of fasteners 258. The rear cover 254 defines a stepped bore 260 adapted to receive a pair of opposed roller bearing assemblies 262, and these bearing assemblies rotatably support the output first planet carrier 74 and an output connecting flange 264 splined to the first planet carrier.

Figure 7:
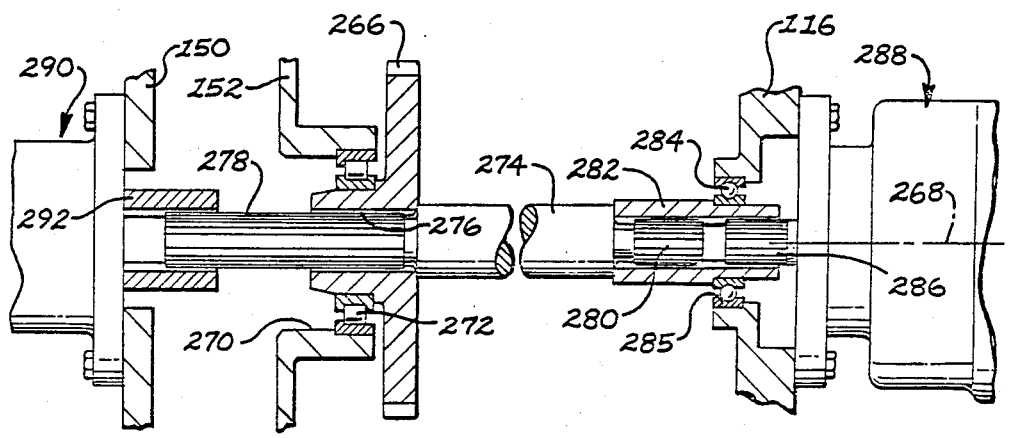
FIG. 7 is a fragmentary, diagrammatic, sectionalized view through an offset axis of the transmission shown in FIGS. 1 and 5, showing a pump drive shaft having opposite ends and first and second pumps driven thereby.

Referring again to FIG. 3, another feature of the countershaft transmission 12 relates to the positive drive provided between the centally mounted pump drive gear 224 on the second axis 28 and another pump drive gear 266 rotatably disposed along an offset fifth axis 268 as is shown in FIG. 7. The pump drive gear 266 is rotatably supported in another stepped bore 270 formed in the intermediate wall 152 by a bearing assembly 272. A pump drive shaft 274 is driven by the pump drive gear 266 through a spline joint 276, and this shaft has a rear external spline 278 and a front external spline 280. A coupling sleeve 282 is rotatably supported bore 285 formed in the front cover 116, and this coupling sleeve is connected to the front external spline and to an input drive shaft 286 of an implement pump 288 releasably mounted on the front cover. At the same time another auxiliary pump 290 is releasably secured to the rear wall 150 which has an internally splined input drive shaft 292 engaged with the rear external spline 278 of the pump drive shaft. Accordingly, it can be appreciated that the pump drive shaft 274 rotates at a speed rate that is a direct function of the speed of the input shaft 18, and is effective to drive both the front implement pump 288 and the rear auxiliary pump 290 without an excessive longitudinal extension of the overall profile of the vehicle transmission 10.

Industrial Applicability

In operation, the input shaft 18 of the transmission 10 of FIG. 1 can be driven at, for example, 2100 rpm by the engine of the vehicle. Assuming that a first forward speed is desired, the operator so controls the vehicle as to cause the low speed clutch assembly 36 of the countershaft transmission 12 and the first brake assembly 72 of the planetary transmission 14 to be hydraulically actuated so as to engage the interleaved plates and discs thereof together. This connects the fourth gear 32 for conjoint rotation with the second shaft 26, such that the seventh gear 52 is driven at a speed of about 1840 rpm by way of the gear pairs 22–32 and 30–52 of the countershaft transmission. This provides a leading speed reduction ratio of about 1.14. In the trailing planetary transmission only the first planetary gear set 58 is activated with the first ring gear 68 being held stationary and with the first sun gear 66 being driven at the speed of the seventh gear 52. This can provide a trailing speed reduction ratio of about 4.57 and an output speed of about 400 rpm at the output first planet carrier 74. These reductions result in an overall reduction ratio of 5.23, and these relationships are generally shown in the chart of FIG. 2.

As indicated by FIG. 2, it is only necessary to disengage the low speed clutch assembly 36 and to engage the high speed clutch assembly 38 in order to shift the transmission 10 from first to second forward speed. In that mode the speed reduction ratio is reduced in the leading countershaft transmission to about 0.76, and the seventh gear 52 is driven at about 2770 rpm through the gear pairs 24–34 and 30–52. The speed of the output first planet carrier 74 would be about 610 rpm, since there is no change in the reduction ratio of the trailing planetary transmission 14.

In order to shift from second to third speed forward the high speed clutch assembly 38 is disengaged and the low speed clutch assembly 36 is engaged so that the leading countershaft transmission 12 operates in a manner similar to the first speed forward mode. In the trailing planetary transmission 14, however, the first brake assembly 72 is disengaged and the second brake assembly 82 is engaged. This holds the second ring gear 80 fixed as a reaction, causing about 56% of the total input torque in the third shaft 44 to be directed through the first sun gear 66 and about 44% of the input torque to be directed through the second sun gear 78 in a split power path. The output first planet carrier 74 is driven at about 720 rpm. Advantageously, the first and second planetary gear sets 58 and 60 are similar in construction; specifically, the ring gears 68 and 80 each have 75 teeth, the sun gears 66 and 78 each have 21 teeth, and the simple planet gears 76 and 86 each have 26 teeth. This allows for greater parts commonality.

A shift from third to fourth speed forward does not change the operation of the leading countershaft transmission 12, but disengages the second brake assembly 82 and engages the third brake assembly 92 of the trailing planetary transmission 14. In this mode about 49% of the input torque via the shaft 44 is directed through the first sun gear 66 and about 51% is directed through the second sun gear 78, with the output first planet carrier 74 being driven at about 820 rpm. Since the first ring gear 68, the second planet carrier 84, and the third sun gear 88 are connected for joint rotation, and the second ring gear 80 and the third planet carrier 94 are connected for joint rotation, a regenerating power path reaction is provided that involves power flow through the first, second and third planetary gear sets 58, 60 and 62.

In order to shift from fourth speed forward to fifth speed foward only the trailing planetary transmission is effected by disengaging the third brake assembly 92 and engaging the fourth brake assembly 104. In such instance the fourth ring gear 102 is held stationary, and 43% of the input torque through the third shaft 44 is directed to the first sun gear 66 and the remainder to the second sun gear 78, and the first planet carrier 74 is driven at about 940 rpm. A regenerative power path reaction is provided in this mode that involves all four planetary gear sets 58, 60, 62 and 64. Like the first and second similarly constructed planetary gear sets 58 and 60, the third and fourth planetary gear sets 62 and 64 are similarly sized. Specifically, each of the ring gears 90 and 102 has 90 teeth, each of the sun gears 88 and 98 has 42 teeth, and each of the planet gears 96 and 108 has 23 teeth for parts commonality and ease of manufacture.

Changing from fifth to sixth speed forward involves disengaging the low speed clutch assembly 36 and engaging the high speed clutch assembly 38 of the leading countershaft transmission 12, and disengaging the fourth brake assembly 104 and engaging the second brake assembly 82 of the trailing planetary transmission 14. The output planet carrier 74 would have a speed of about 1080 rpm.

Upshifting to seventh gear forward would not affect the countershaft transmission 12, but would cause the disengagement of second brake assembly 82 and engagement of the third brake assembly 92 in its place to provide a speed of the output planet carrier 74 at about 1240 rpm.

Upshifting to eighth forward would again only involve the planetary transmission 14 by requiring the disengagement of the third brake assembly 92 and engagement of the fourth brake assembly 104. An output speed of about 1420 rpm would be provided.

Upshifting to ninth would involve a return to the engagement of the low speed clutch assembly 36 in the countershaft transmission 12, and to the engagement of the direct drive clutch assembly 110 for the first time in the planetary transmission 14. A major portion of the planetary transmission would rotate at the same time to provide a step ratio of 1:1 with respect to the speed of the third drive shaft 44 since all of the sun gears 66,78,88 and 98 would be locked together. An output speed of about 1840 rpm would be provided.

In the top gear the high speed clutch assembly 38 is engaged along with the direct drive clutch assembly 110 to give an output speed of 2760 rpm.

Referring to FIG. 2, and particularly the last line thereof, it can be appreciated that the most frequently used step ratio, coinciding with upshifting from third gear to seventh gear, is about 1.15. This very desirable, and relatively narrow step throughout the majority of the working range allows the operator of the vehicle to better match the transmission to the implement loads for improved overall operating efficiency.

In the instant embodiment, first speed reverse is achieved by engaging the reverse speed clutch assembly 56 in the leading countershaft transmission 12. This connects the eighth gear 54 for conjoint rotation with the third shaft 44 such that the third shaft is driven at about 1350 rpm by way of the gear transfer train of intermeshing gears 22-32-40-54. Simultaneously the planetary transmission 14 is disposed in the lowest range with only brake assembly 72 being engaged and the first planetary gear set 58 being operational. This gives an output speed of about 295 rpm.

Second speed reverse is accomplished by disengaging brake assembly 72 in the planetary transmission 14 and engaging brake assembly 104 to activate the fourth planetary gear set 64. This provides an output speed of about 690 rpm.

One of the advantages with the construction of the planetary transmission 14 is that the first planetary gear set 58 is located rearwardly of the remaining planetary gear sets 60, 62 and 64 and rearwardly of the rear wall 150 as can be noted by reference to FIG. 4. Therefore, in the event that it is desired to transmit additional input horsepower to it via third shaft 44, it is only necessary to enlarge the diameter of the first brake assembly 72, to increase the number of interleaved plates and discs thereof, and/or to increase the size of the members 66,68,76 of the first planetary gear set 58 without changing the remainder of the planetary gear sets. This can be achieved conveniently since the first planetary gear set is disposed externally of bore 158. The torque loads transmitted through the first sun gear 66, and the torque reaction of the first ring gear 68 decrease with increasing speed of the output planet carrier 74 so that the lowest vehicle ground speed represents the greatest torque loads for design purposes.

In view of the foregoing it is apparent that the countershaft transmission 12 and the planetary transmission 14 are both simple and rugged in construction, and are compactly coupled together while being adaptable to a relatively moderate drop height requirement between the axes 20 and 48. It can be appreciated that the lower transverse width designated by the arrows and the letter W in FIG. 5 is also moderate in order to fit between the longitudinal main frame arms of a vehicle, although not shown. Moreover, the transmission 10 can provide 10 forward speeds and 2 reverse speeds with a plurality of narrow step ratios between the third to eighth gear modes to better match the vehicle to various agriculturally related implements used therewith. And still further, the countershaft transmission is particularly adaptable to a highly desirable elevated PTO location coaxial with the input power source and to driving a plurality of hydraulic pumps 146, 288 and 290 at locations allowing convenient accessibility thereto for servicing within the compact external envelope of the transmission.

Other aspects, objects and advantages of this invention can be obtained from a study of the drawings, the disclosure, and the appended claims.

We claim:

1. A planetary transmission comprising:
   an input shaft;
   a first planetary gear set having a first sun gear driven by the input shaft, a first planet carrier serving as the output, a first ring gear, and first brake means for selectively holding the first ring gear stationary;
   a second planetary gear set having a second sun gear driven by the input shaft, a second planet carrier connected for joint rotation to the first ring gear, a second ring gear, and second brake means for selectively holding the second ring gear stationary;
   a third planetary gear set having a third sun gear connected for joint rotation to the second planet carrier, a third planet carrier connected for joint rotation to the second ring gear, a third ring gear, and third brake means for selectively holding the third ring gear stationary; and
   clutch means for connecting the third sun gear to the input shaft and providing a direct drive mode of operation.

2. A planetary transmission comprising:
   an input shaft;
   a first planetary gear set having a first sun gear driven by the input shaft, a first planet carrier serving as the output, a first ring gear, and first brake means for selectively holding the first ring gear stationary;
   a second planetary gear set having a second sun gear driven by the input shaft, a second planet carrier connected for joint rotation to the first ring gear, a second ring gear, and second brake means for selectively holding the second ring gear stationary;
   a third planetary gear set having a third sun gear connected for joint rotation to the second planet carrier, a third planet carrier connected for joint rotation to the second ring gear, a third ring gear, and third brake means for selectively holding the third ring gear stationary; and
   a fourth planetary gear set having a fourth sun gear connected for joint rotation with the third sun gear, a fourth planet carrier connected for joint rotation with the third ring gear, a fourth ring gear, and fourth brake means for selectively holding the fourth ring gear stationary.

3. The planetary transmission of claim 2 including a countershaft transmission including a low clutch assembly, a high clutch assembly, and a reverse clutch assembly of a construction sufficient for selectively driving the input shaft at one of two forward speeds and one reverse speed.

* * * * *